Sept. 17, 1957 F. R. KULL 2,806,494
FEEDING AND DRIVING MECHANISM FOR HOLLOW SET SCREWS
Filed March 27, 1956 5 Sheets-Sheet 1
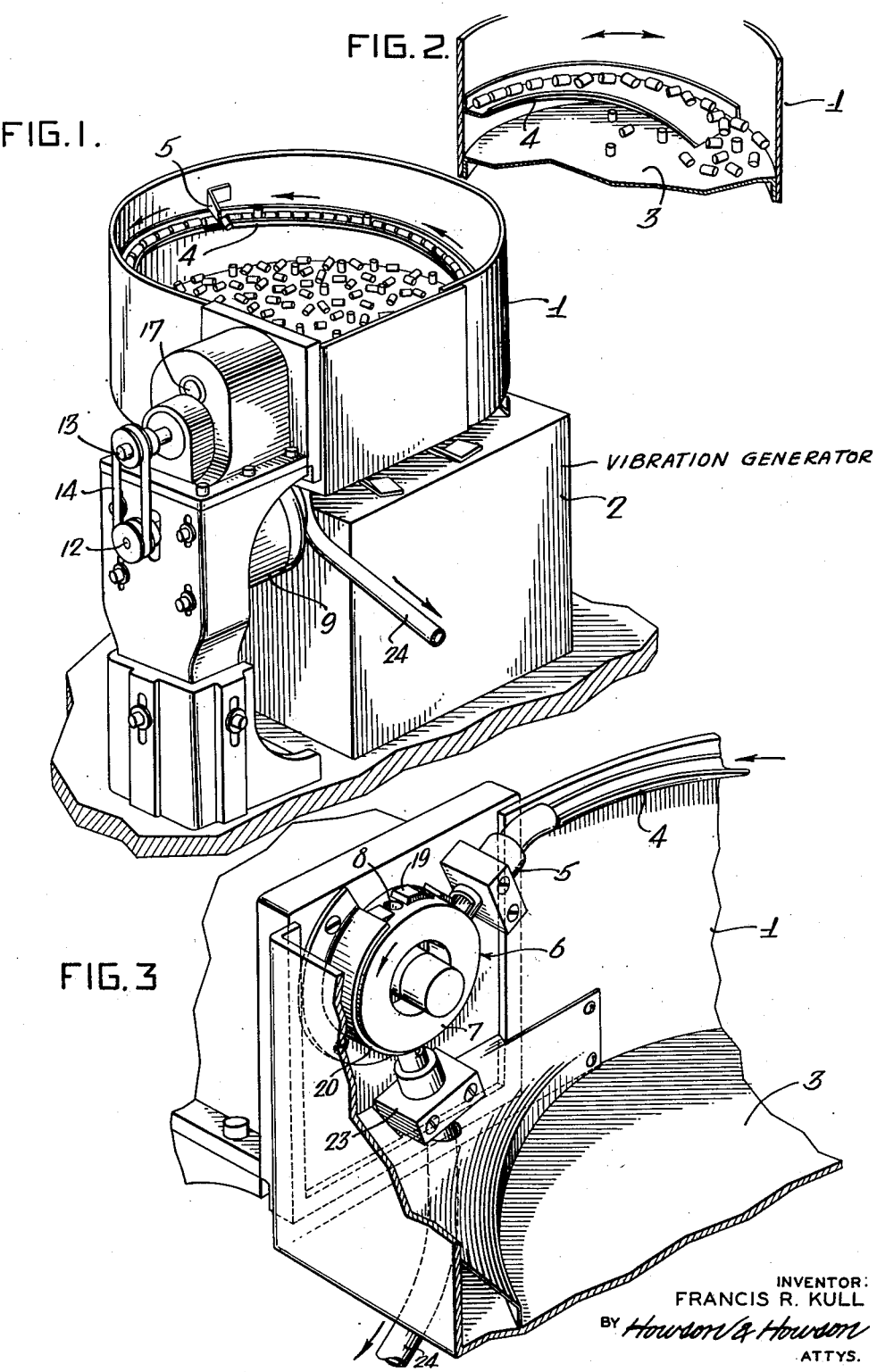
INVENTOR:
FRANCIS R. KULL
BY Howson & Howson
ATTYS.

Sept. 17, 1957   F. R. KULL   2,806,494
FEEDING AND DRIVING MECHANISM FOR HOLLOW SET SCREWS
Filed March 27, 1956   5 Sheets-Sheet 2
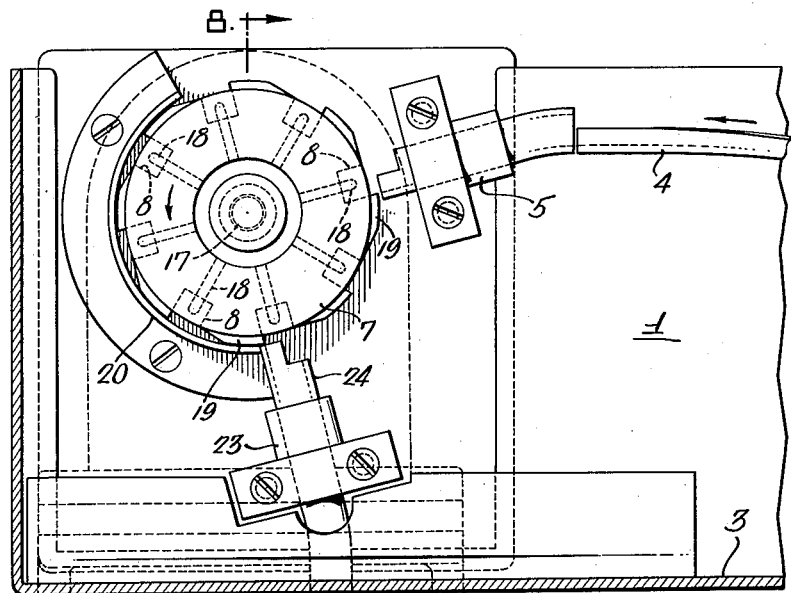
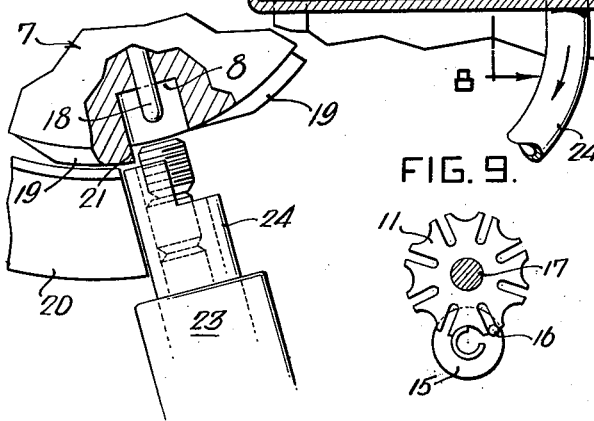
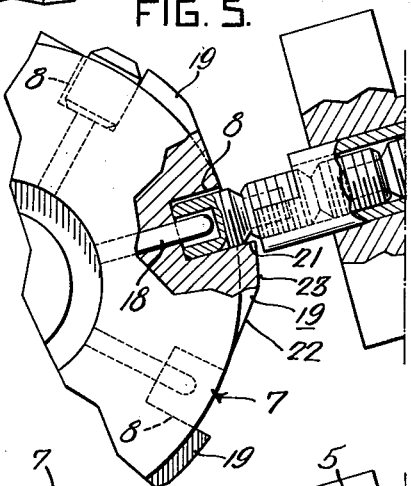
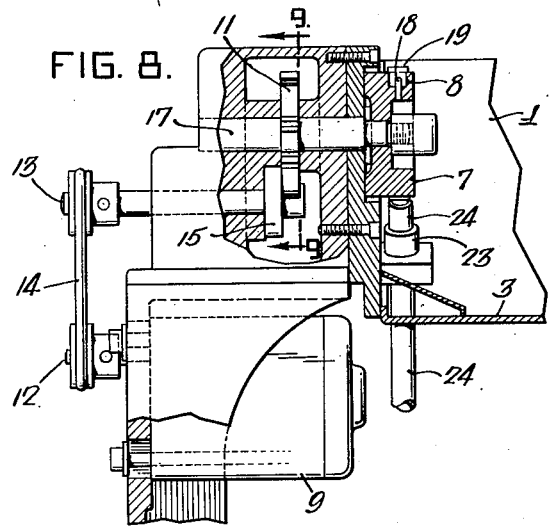
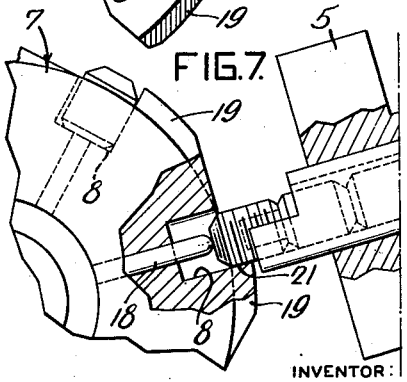
INVENTOR:
FRANCIS R. KULL
BY Howson & Howson
ATTYS.

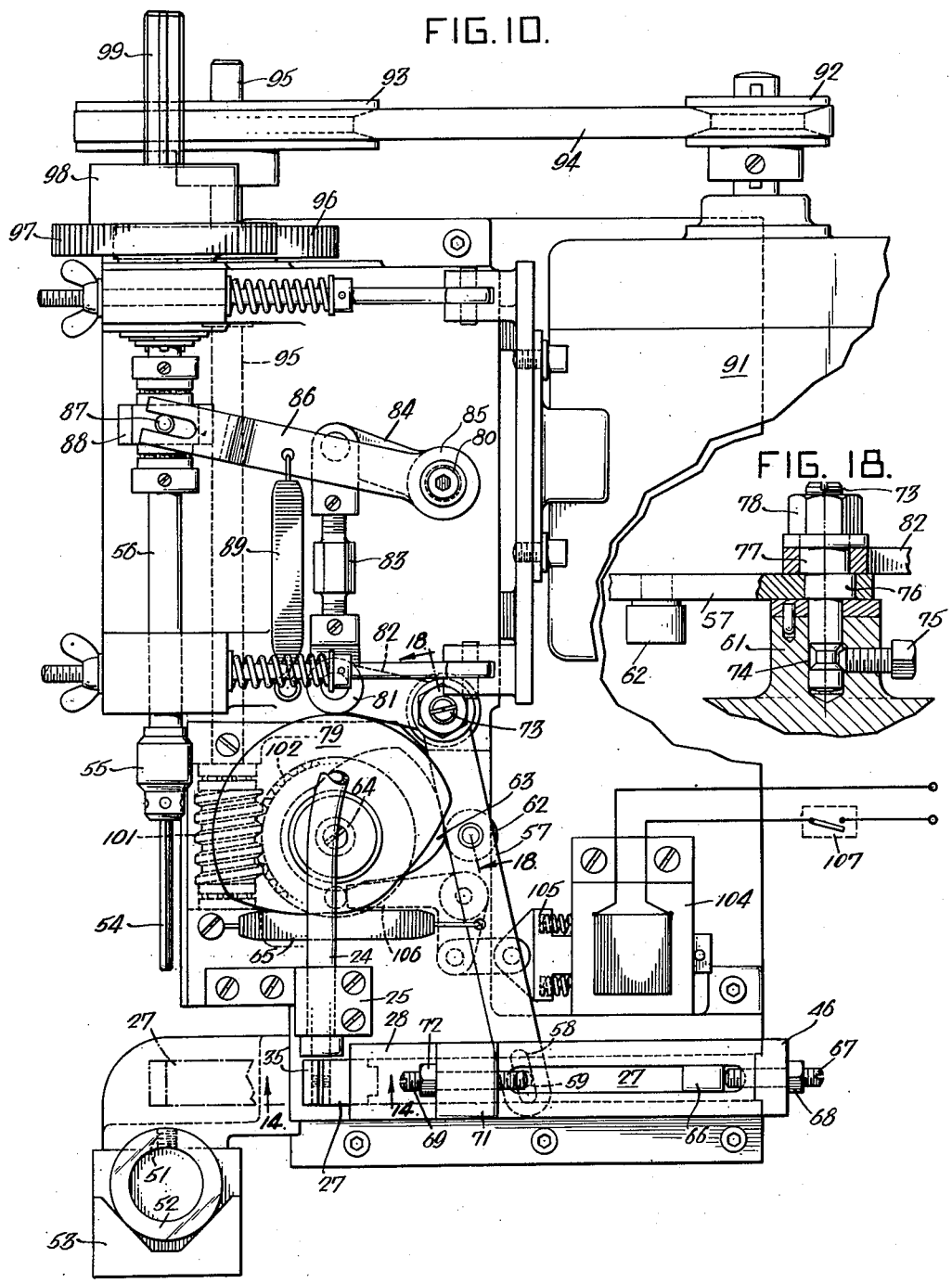

Sept. 17, 1957    F. R. KULL    2,806,494
FEEDING AND DRIVING MECHANISM FOR HOLLOW SET SCREWS
Filed March 27, 1956    5 Sheets-Sheet 4
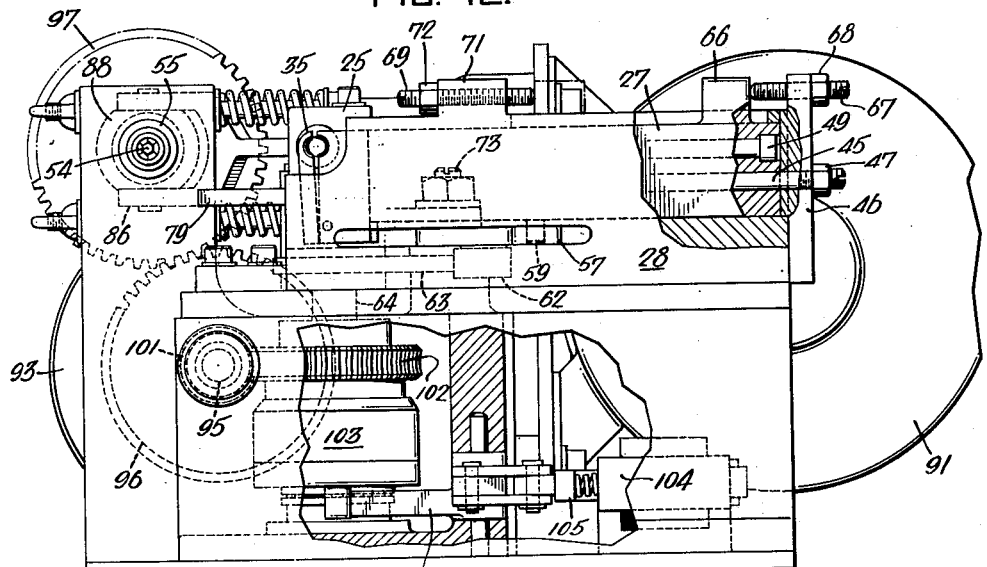
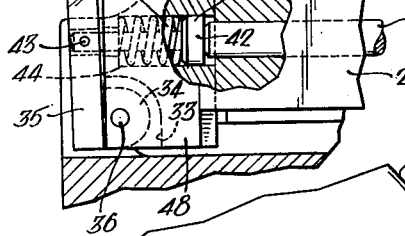
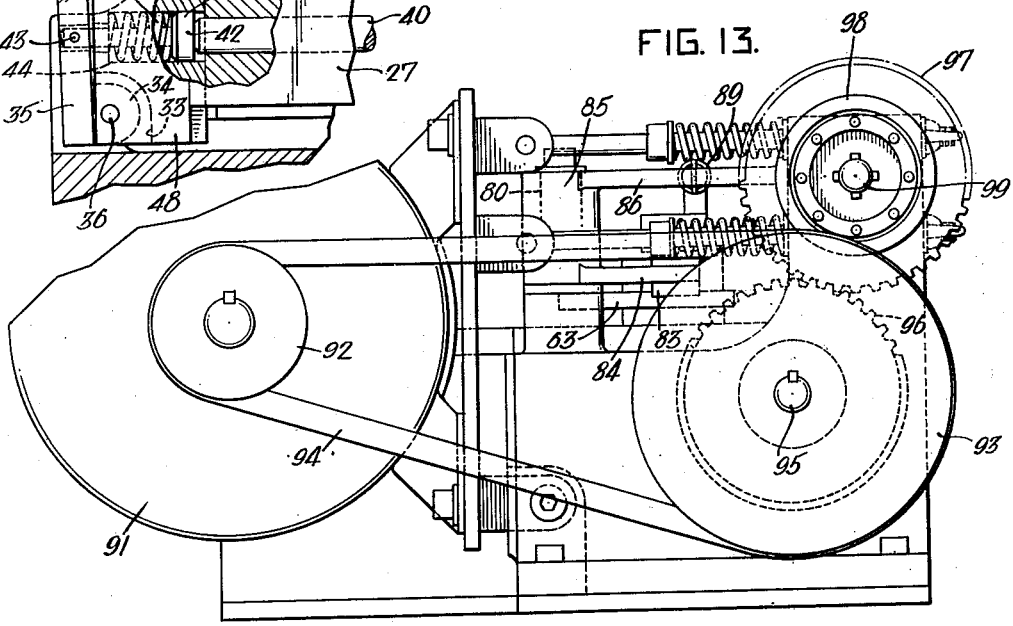
INVENTOR:
FRANCIS R. KULL
BY Howson & Howson
ATTYS.

Sept. 17, 1957 F. R. KULL 2,806,494
FEEDING AND DRIVING MECHANISM FOR HOLLOW SET SCREWS
Filed March 27, 1956 5 Sheets-Sheet 5
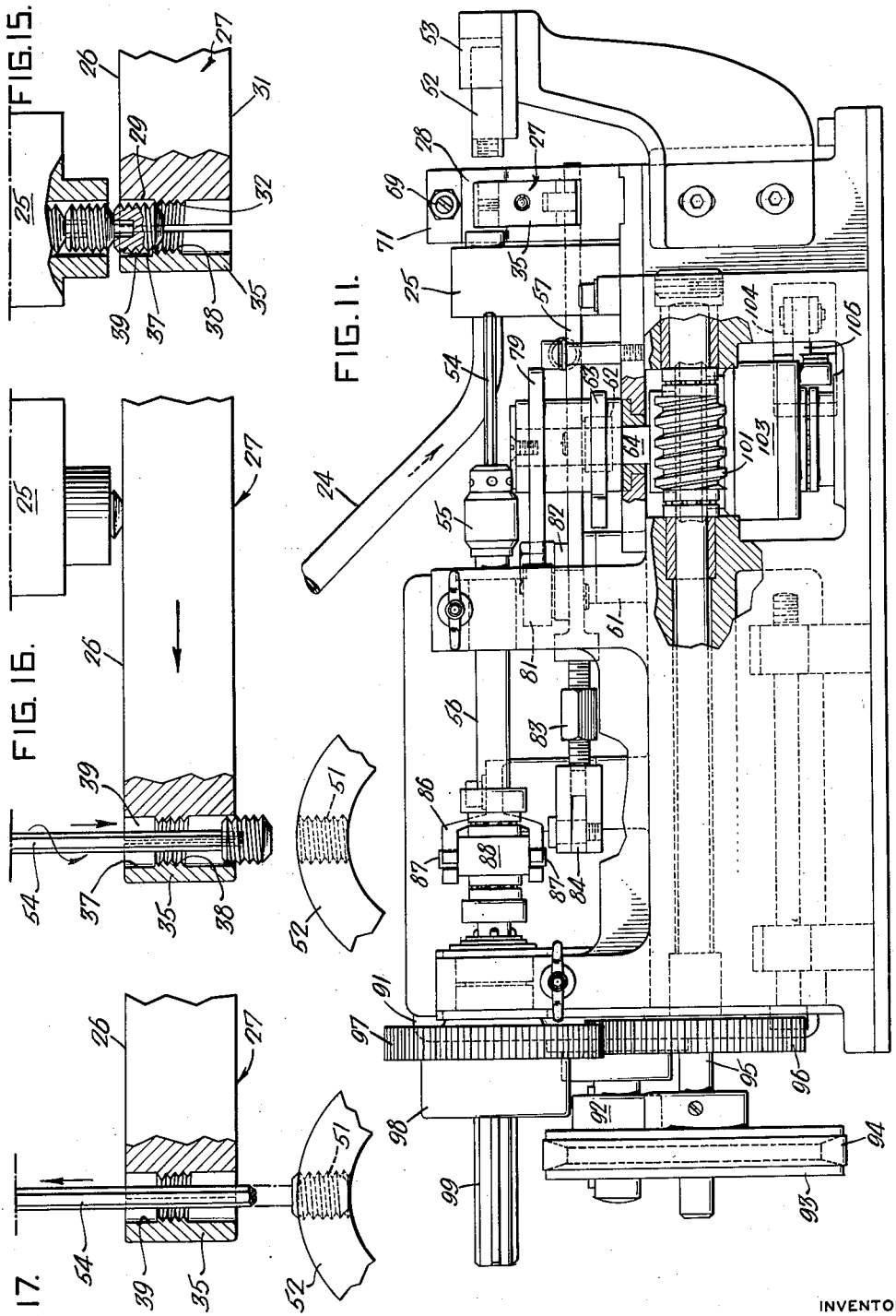
INVENTOR:
FRANCIS R. KULL
BY Howson & Howson
ATTYS.

United States Patent Office 2,806,494
Patented Sept. 17, 1957

2,806,494

FEEDING AND DRIVING MECHANISM FOR HOLLOW SET SCREWS

Francis R. Kull, Davisville, Pa., assignor to Standard Pressed Steel Co., Jenkintown, Pa., a corporation of Pennsylvania Application March 27, 1956, Serial No. 574,286

18 Claims. (Cl. 144—32)

This invention relates to automatic feeding and driving mechanisms of the general type disclosed in the pending United States patent application Serial No. 540,950 of Charles A. Wilson.

Machines of this type comprise in general a hopper in which hollow set screws or the like are deposited, said hopper including devices for feeding the screws successively to selector mechanism which operates to discharge the screws from the hopper successively and in predetermined oriented relation. The machines also include devices for feeding the oriented screws one at a time to a screw driving mechanism which operates to drive the screws into work pieces located at a predetermined assembly station.

A principal object of the present invention is to improve the structural and functional characteristics of machines of this type.

A specific object of the invention is to provide an improved orienting pick-up for the screws in the hopper and to thereby materially improve the operating efficiency of the machine.

Another object of the invention is to provide improved mechanism for feeding the screws to the assembly station and for threading the screws in the individual work pieces.

The invention resides also in certain novel structural and mechanical details hereinafter described and illustrated in the attached drawings wherein:

Fig. 1 is a view in perspective of the feed hopper and associated orienting pick-up mechanism;

Fig. 2 is a fragmentary sectional view of the hopper illustrating the general manner in which the screws are fed in succession to the orienting mechanism;

Fig. 3 is an enlarged fragmentary sectional view of the orienting mechanism;

Fig. 4 is a fragmentary sectional view showing the orienting mechanism in front elevation and on a still larger scale;

Fig. 5 is a fragmentary enlargement showing a portion of the orienting mechanism illustrated in Fig. 4, a part of the mechanism being broken away to show certain structural details;

Fig. 6 is a view similar to Fig. 5 showing another detail of the orienting mechanism illustrated in Fig. 4;

Fig. 7 is a view similar to Fig. 5 but illustrating the function of the orienting mechanism to reject unoriented screws;

Fig. 8 is a fragmentary sectional elevational view showing the drive means for the orienting mechanism;

Fig. 9 is a sectional view on the line 9—9, Fig. 8;

Fig. 10 is a plan view of the mechanism for feeding the screws to the assembly station and for subsequently driving the screws into the work;

Fig. 11 is a side elevational view of the mechanism shown in Fig. 10;

Fig. 12 is a front end elevational view of the mechanism shown in Fig. 10;

Fig. 13 is a fragmentary rear elevational view of the aforesaid mechanism;

Fig. 14 is a fragmentary sectional view on the line 14—14, Fig. 10;

Fig. 15 is a fragmentary enlarged view illustrating the manner in which the screws are fed to the assembly position;

Fig. 16 is a corresponding view showing a screw in the assembly position;

Fig. 17 is a view illustrating the driving tool in the process of retraction from a screw after the latter has been driven into the work piece, and Fig. 18 is a sectional view on the line 18—18, Fig. 10.

With reference to the drawings, the reference numeral 1 designates a hopper in which hollow set screws or the like are deposited indiscriminately by any suitable means. This hopper is supported on and is vibrated by a generator 2, hopper and vibrator assemblies of this general type being known and available in the trade. From the floor 3 of the hopper 1, the screws are advanced by the vibratory action upwardly along a helical or inclined track 4 at the inside of the hopper wall, the track being dimensioned so as to guide the screws in single file. Any screw which may inadvertently be upended as indicated for example in Fig. 1 will be discharged from the track 4 by a stop 5 projecting inwardly from the wall of the hopper. As shown in Fig. 3 the track 4 terminates in a hollow fitting 5 through which the screws are conducted one at a time to an orienting pick up indicated generally by the reference numeral 6.

The orienting device comprises a wheel 7 which has in its peripheral surface a circumferential series of equally spaced radial cylindrical recesses or pockets 8, these recesses being of a size to receive the screws as illustrated for example in Fig. 5. The wheel 7 is rotated intermittently by mechanism illustrated in Figs. 8 and 9 comprising an electric motor 9 and an escapement wheel 11, see Fig. 9, which is driven from the motor through jack shafts 12 and 13, a belt 14, suitable reduction gearing (not shown) which connects the jack shaft 12 to the motor, and a wheel 15 on the shaft 13 which carries a pin 16 for operative association with the escapement wheel 11 in well known manner. Continuous rotation of the shaft 13 and of the wheel 15 results in an intermittent rotary movement of the wheel 11 and through this wheel of the shaft 17 which carries the orienting wheel 7.

The movements of the wheel 7 are indexed with respect to the discharge end of the fitting 5 so that each of the cylindrical pockets 8 is successively brought into alignment with the discharge end of the said fitting as illustrated in Fig. 4. Each of the pockets 8 has projecting radially from the bottom thereof a pin 18, and if the socketed end of a set screw moving into the fitting 5 is at the leading end of the screw, the latter will be permitted to enter the aligned pocket 8 as illustrated in Fig. 5. A subsequent movement of the wheel 7 will bring the next succeeding pocket 8 into alignment with the end of the fitting 5 and will carry away from the end of the fitting the screw received in the preceding pocket.

As shown in Fig. 5, the wheel 7 has at the trailing side of each pocket a peripheral projection 19, the leading end 21 of which is aligned with the proximate side of the adjoining pocket 8 and the opposite or trailing end is inclined as indicated at 22 so as to form a ramp extending substantially to the proximate side of the next following pocket 8. The outer or peripheral surface 23 of the projection moves under and supports the screw occupying the discharge end of the fitting 5, and during the angular movement of the wheel 7 acts to retain that screw in the end of the fitting until a pocket 8 is in position to receive it. If a set screw, attempting to enter one of the pockets 8, has its solid or tip end directed toward the pocket, such screw will be prevented from entering the pocket by the pin 18, as shown in Fig. 7. In the subsequent angular movement of the wheel 7, therefore, the end 21 of the projection 19 will displace the screw from the end of the fitting 5, and it will be noted that in order to permit such displacement, the upper side of the discharge end of the fitting is left open and unobstructed so that the terminal screw under circumstances described above may be dislodged from both the fitting and the wheel 7 to fall again to the bottom of the hopper 1.

Opposite the lower side of the wheel 7 is a second or screw-receiving fitting 23 which lies at the upper end of a conducting tube 24. The movements of the wheel 7 are indexed with respect to the fitting 23 so that at each stationary position of the wheel 7 one of the pockets 8 will lie in alignment with the confronting hollow end of the fitting 23. In the intermittent progressive movement of any one of the pockets 8 between the fitting 5, where it receives a set screw, and the fitting 23, where the screw is discharged from the pocket, the screw will be retained in the pocket by a suitable guard segment 20, this segment terminating at the side of the terminal end of the fitting 23. The screws will thus be carried successively from the fitting 5 to the fitting 23 into which they are deposited to move downwardly by gravity through the duct 24. The manner in which the screws are deposited in the upper end of the fitting 23 is best shown in Fig. 6 wherein it will be noted that should the fitting 23 and the conducting tube 24 be filled to capacity with the set screws, the leading end 21 of the projection 19 at the trailing side of the pocket from which a screw has been deposited will act in the next following angular movement of the wheel 7 to displace the screw from the end of the fitting 23, the terminal end of the fitting being formed in the same manner as the end of the fitting 5 to permit of such displacement. Screws thus just displaced from the upper end of the fitting will fall to the floor of the hopper.

Screws deposited in the fitting 23 as described will pass downwardly through the tube 24 to a hollow horizontally disposed terminal fitting 25. The terminal end of this fitting lies in confronting relation to one side face 26 of a slide 27 which is guided for longitudinal reciprocation in a relatively fixed guide structure 28. At one end, the slide 27 has a semi-cylindrical recess 29 which extends across the end of the slide from the face 26 to the opposite face 31, see Fig. 15. The end of this recess which adjoins the face 26 is unthreaded, whereas the immediately adjoining portion of the recess extending toward the surface 31 is threaded as indicated at 32 in Fig. 15. The slide 27 is recessed at its outer end, as indicated in Fig. 14 by the broken line 33, for reception of a boss 34 at the lower end of a jaw member 35 which occupies a position at the end of the slide as illustrated and in effect forms a part of the latter. The boss 34 is secured in the recess 33 by a pin 36 so that in effect the jaw 35 is hinged to the end of the slide body. The upper end of the jaw 35 overlies the recess 29 in the end of the slide body and has in its inner face a complementary semi-cylindrical recess 37. Like the recess 29, the end of the recess 37 which adjoins the face 26 is unthreaded whereas an adjoining portion of the recess 37 is threaded as indicated at 38. The unthreaded terminal portions of the recesses 29 and 37 at the face 26 form the complementary opposite sides of a cylindrical pocket, this pocket, designated generally by the reference numeral 39, see Figs. 15 and 16, being of a size to receive one of the set screws as shown more particularly in Fig. 15. The confronting threaded portions of the recesses 29 and 37 also form the complementary opposite sides of a threaded pocket which forms a continuation of the unthreaded pocket 39.

Normally, the jaw 35 will be retained in a retracted position as shown in Fig. 14, and as shown also in Figs. 16 and 17, by a spring 41. This spring is operatively associated with a plunger 42 which is pivotally connected at 43 to the jaw, the spring occupying a recess 44 in the end of the slide and being confined between the bottom of the recess and a flange or head 45 on the end of the plunger. The jaw 35 can be moved against the pressure of the spring to radially expand the unthreaded pocket 39 by means of a rod 40 which extends longitudinally and slidably through the slide 27 and which is anchored in a relatively fixed cap member 46 at the end of the guide in which the slide operates. As shown in Fig. 12, the rod 45 is threaded into the cap 46 and is locked by means of a nut 47 and its position is, therefore, adjustable. When the slide 27 occupies the extreme right hand end of its path of movement, the opposite end of the rod 45 will engage the plunger 42 and through the plunger will shift the jaw 35 slightly to the left as viewed in Fig. 14 so as to somewhat expand the pocket 39 as previously described.

It will be noted that in the present instance, the slide 27 has at its left end, as viewed in the drawings, a block 48 which is secured to the slide body by a bolt or bolts 49 in the slide, and that the jaw assembly including the plunger 42 and spring 41 is mounted on this block 48.

When the slide 27 is fully retracted as shown in Fig. 12, and also in Figs. 14 and 15, the pocket 39 is in axial alignment with the discharge end of the fitting 25 which as previously described is connected to the lower end of the duct 24. In this position also as described above, the jaw 35 has been adjusted outwardly to radially expand the pocket 39 so that screws passing down the tube 24 and through the fitting 25 may freely enter the said pocket. The expansion of the pocket is such, however, that the screw thus entering the pocket will be stopped by the threads 32 and 38 so that the screw will occupy the position shown in Fig. 15. The succeeding screw in the fitting 25 will then bear against the outer end of the screw which occupies the pocket 39.

By mechanism hereinafter described the slide 27 is moved to the left to a position shown in Fig. 16 and in broken lines in Fig. 10. In the initial part of this movement of the slide, the jaw 35 is released by the rod 45 and the spring 41 is then permitted to return this jaw to the normal retracted position in which it loosely confines the screw then occupying the pocket 39. The screw is thus carried to the position shown in Fig. 16 in which the pocket 39 is in axial alignment with a tapped hole 51 in a work piece 52 supported in predetermined fixed position in a work supporting fixture 53 as shown in Fig. 10. In this position of the slide 27, the pocket 39 is also in axial alignment with a screw driving tool or wrench 54 which is held in a chuck 55 at the end of an axially reciprocatory spindle 56 which is reciprocated and simultaneously rotated by mechanism hereinafter described. The wrench 54 thus advanced engages the correspondingly shaped socket at the outer end of the screw then occupying the pocket 39 with the result that the screw is turned into and through the threaded end of the pocket and into the tapped hole 51 of the work piece 52 as indicated in Fig. 17. It will be noted that the distance between the work piece 52 and the end of the thread in the slide pocket is in excess of the length of the screw so that the threads of the screw will have cleared the pocket threads before engaging the threads of the tapped hole 51.

After the screw has initially engaged the threads of the work piece, the forward movement of the wrench 54 may be terminated with the result that the continuing rotation of the wrench will cause the screw to thread itself into the tapped hole and eventually disengage itself from the wrench. While this mode of operation is suitable for a simple assembly of the screw in the work piece, it is not well adapted for assembly operations wherein the screw after entering a tapped hole in the work is driven with application of suitable torque against a shaft or other member to which the work piece is to be attached. In such case the advance movement of the wrench is preferably continued until the driving operation is completed so that advantage may be taken of the full depth of the screw socket during the torquing step. Such driving of the screws is provided for in the use of the spring 89 to advance the wrench and by the clutch 98 which may be set to slip at maximum permissible torque. For this type of work, a clutch of the magnetic type is desirable, by reason of the relatively great simplicity and flexible of torque control and regulation which it affords.

After retraction of the wrench 54, the slide will be returned to the original retracted position for reception of the next following screw from the terminal end of the fitting 25. This screw during the reciprocation of the slide described above will seat against the side face 26 of the slide, as illustrated in Fig. 16, and will thereby be retained in the end of the fitting 25 and in position for immediate entrance into the pocket 39 of the slide when the latter has returned to the fully retracted position.

It will be apparent from the foregoing description that the terminal position of the slide 27 at one end of its travel must be in precise alignment with the discharge opening in the fitting 25, and in alignment at the other end of its travel with the wrench 54 and tapped hole 51 in the work piece. The slide 27 is actuated by a rocker arm 57, see Fig. 10, the outer end of which is slotted as indicated at 58 for reception of a pin 59 which depends from the underside of the slide as shown in Fig. 12. The lever 57 is pivoted at 61 to a fixed part of the frame, and the lever carries a follower 62 for operative engagement with a lever-actuating cam 63 on a vertical cam shaft 64. A spring 65 is attached to the lever 57 and tends to hold the follower 62 in contact with its cam 63. Thus, in moving the slide 27 to the right as viewed in Fig. 10 of the drawings, the lever 57 will be under actuation by cam 63 whereas the return movement of the lever is by action of the spring 65.

The slide 27 has an upstanding lug 66 which at one end of the path of travel of the slide, i. e. when the slide occupies the position of Fig. 15, will engage the end of a stop screw 67 threaded into the cap 46 and locked in position by a nut 68, see Fig. 12. When the slide is in the other extreme position shown in Fig. 16, the lug 66 will engage an end of a set screw 69 which is threaded into a boss 71 in the frame of the machine and which is locked in adjusted position by a lock nut 72.

Extreme accuracy in the indexing of the slide pocket 39 with the fitting 25 and with the tool 54 is provided for by an eccentric device in the pivot 61. As shown in Fig. 18, the pivot 61 comprises a pin 73 which is rotatably mounted in a cylindrical recess 74 in the frame of the machine and which is, therefore, adjustable about its own axis. The pin may be locked in adjusted position by a set screw 75. The pin comprises an eccentric portion 76 on which the end of the lever 57 is pivoted. The pin comprises also an adjoining concentric portion 77, the function of which will be hereinafter described, and the upper end of the pin is threaded for reception of a lever retaining nut 78. It will be apparent that by release of the set screw 75, the pin may be adjusted about its axis; and that through the eccentric 76, this adjustment will affect the position of the pivotal axis about which the lever 57 oscillates. Slight movement of the axis to left or right as viewed for example in Fig. 10 will necessarily affect the position of the opposite end of the lever which is connected to the slide 27.

In adjusting the slide to the critical terminal stations described above, the set screws 67 and 69 may be backed off and the cam 63 turned to move the slide to the extreme right hand position as viewed in Fig. 10. The eccentric pin 73 may then be rotated to bring the slide into a position wherein there is exact indexing or axial alignment between the pocket 39 and the discharge end of the fitting 25. The pivot pin may then be anchored by means of set screw 75 and the stop screw 67 turned in until it just touches the boss 66 of the slide. The cam 63 may then be further rotated to permit the spring 67 to move the slide to the left, the extent of movement permitted by the cam being at least as great as that required to bring the pocket 39 into axial alignment with the wrench 54. The stop screw 69 may then be turned inwardly to the point where it contacts the boss 66 and when anchored in this position will definitely establish the extreme left hand position of the slide. Re-adjustment due to wear in the parts may follow the same general pattern.

The shaft 64 carries a second cam 79 which engages a roller 81 on the end of an arm 82. One end of this arm is pivotally connected to the concentric portion 77 of the pin 73, as shown in Fig. 18. The other end of the arm 82 is attached to one end of a longitudinally adjustable link 83, the other end of which link is connected to an arm 84 secured to a sleeve 64 journalled on a vertical pin 80 on the frame of the machine. To the upper end of this sleeve 85 is connected one end of a lever 86, the slotted free end of which is operatively connected through pin 87 with a collar 88 journalled on the spindle 56 to which the tool chuck 55 is connected. A spring 89 connected to the arm 86 tends to draw the arm downwardly as viewed in Fig. 10 so as to advance the spindle 56 and wrench 54 into operative position with respect to the pocket 39 as previously described. The cam 79, however, controls the working position of the spindle. In other words, the cam in its rotation retracts the spindle, as illustrated in Fig. 10, and permits the spring 89 to advance the spindle for the working stroke of the wrench 54. The link 83 affords adjustment of the ultimate working position of the wrench. It is apparent, that the movements of the slide 27 and of the wrench 54 are synchronized so that these elements operate in a timed relation to effect the sequence of operations previously described.

The aforedescribed mechanism is actuated by a motor 91 which is connected through pulleys 92 and 93 and a belt 94 with a shaft 95. The shaft 95 carries a gear 96 which meshes with a gear 97 and this gear is connected through a friction clutch 98 with a splined end 99 of the wrench spindle 56. By this means the shaft 56 may be rotated while leaving it free for axial reciprocation through the medium of the arm 86 and the associated elements which connect this arm operatively with the cam 79. The shaft 95 also carries a worm 101 which meshes with a worm wheel 102 operatively connected through a single revolution clutch 103 with the cam shaft 85. The clutch 103 is controlled by a solenoid 104 whose armature 105 is connected to the trip lever 106 of the clutch. The continuous rotation of the worm wheel 102 is thus transformed into intermittent rotation of the shaft 64 under control of the solenoid 104. As shown in Fig. 10, this solenoid may be connected with a control switch 107 which provides for intermittent operation of the machine under control of an operator.

The operation of the machine will be apparent from the aforegoing description, it being noted that on each full revolution of the machine, the slide 27 is given one full complete reciprocation to transfer a screw from the receiving position at the fitting 25 to the position in which the wrench 54 may operate to drive the screw into the adjoining work piece, and to actuate the tool 54 in timed relation with the movements of the slide to so drive a screw presented to the tool by the slide 27 into the tapped hole of the work piece 52.

I claim:

1. In apparatus of the character described, means for supporting work pieces at an assembly station, a reciprocatory carrier for presenting screws successively at said station for assembly in the work pieces, a reciprocatory tool at said station for effecting said assembly, resilient means for advancing the carrier to the station and for advancing the tool to effect said assembly, cam means for controlling the advance movements of and for retracting said tool and carrier means, and mechanism for actuating said cam means.

2. Apparatus according to claim 1 wherein the cam means for controlling the advance of and for retracting the carrier includes a cam, a lever operatively connecting the cam with the carrier, and a pivot structure for the lever comprising means for parallel adjustment of the position of the pivotal axis of said lever.

3. Apparatus according to claim 2 wherein the pivot structure comprises a rotatably mounted pin having an eccentric portion forming the pivot for said lever, and means for locking the pin in adjusted positions.

4. Apparatus according to claim 3 wherein the cam means for controlling the movement of and for retracting the said tool includes a cam separate from the cam first named, an oscillatory lever actuated by said cam, and a concentric portion on said pin forming a pivot for said lever.

5. In apparatus of the character described, means for supporting work pieces at an assembly station, a reciprocatory carrier for presenting screws successively at said station for assembly in the work pieces, means for feeding screws to said carrier at a receiving station remote from the assembly station, resilient means for advancing the carrier from the receiving station to the assembly station, a reciprocatory tool at the assembly station and means for advancing the tool to effect said assembly, cam means for controlling the advance movements of and for retracting said tool and carrier means, said means including a pivoted actuating lever connected to the carrier, mechanism for actuating said cam means, and means for indexing the carrier at the receiving and assembly stations, said indexing means comprising a pivot structure for said lever, and means in said structure for parallel adjustment of the pivotal axis of said lever.

6. Apparatus according to claim 5 including as an element of said indexing means an adjustable stop for limiting the advance movement of said carrier.

7. Apparatus according to claim 6 including a second stop for limiting the retractive movement of the carrier.

8. In apparatus of the character described, means for supporting work pieces at an assembly station, a reciprocatory carrier for presenting screws successively at said station for assembly in the work pieces, mechanism at said station for effecting said assembly, a receiving station remote from said assembly station, means at said receiving station for feeding screws successively to the carrier, resilient means tending to advance the carrier to the assembly station, and a cam for controlling the advance movement of the carrier under actuation by said resilient means and for retracting the carrier to the receiving station.

9. In apparatus of the character described, means for supporting work pieces at an assembly station, a reciprocatory carrier for presenting screws successively at said station for assembly in the work pieces, means for feeding screws successively to the carrier at a receiving station remote from said assembly station, a pocket in said carrier having an unthreaded end portion adapted to receive the screws at said receiving station, and having an adjoining threaded portion for threaded engagement with the screw, and means at the assembly station for transferring the screw from the pocket into the work piece, said transfer means comprising a reciprocatory tool adapted to engage the screw in the unthreaded end of said pocket and means for rotating and simultaneously advancing said tool so as to advance the screw through the threaded portion of the pocket and into the work piece.

10. Apparatus according to claim 9 wherein the carrier comprises relatively movable members containing complementary parts of said pocket, devices for relatively moving said parts to radially expand the pocket and for subsequently contracting the pocket, and means for actuating said devices to effect expansion of the pocket at the receiving station and contraction of the pocket at the assembly station.

11. In apparatus of the character described, a reciprocatory carrier, means for supporting a work piece at one side of the path of movement of said carrier, means for feeding set screws to the carrier from a point on the opposite side of said path and remote from said work supporting means, said feeding means including a delivery nozzle at said point having a discharge opening in closely confronting relation to the proximate side surface of the carrier, a screw-receiving pocket in the carrier extending from the said side surface to the opposite face of the carrier, a reciprocatory tool on the opposite side of said path of travel from the work-supporting means for transferring a screw from the pocket to the work piece, means for feeding screws continuously to the delivery nozzle and into contact with the confronting surface of the carrier as a stop, means for moving the carrier in said path between alternative positions in one of which the pocket is aligned with the nozzle opening to admit a screw to the pocket and in the other of which the pocket is aligned with the said tool and with the work piece, means in said pocket for limiting said admission to a single screw, and means for actuating the carrier and tool in timed relation to deliver screws successively from the nozzle to the tool and to transfer the screws so delivered to the work.

12. Apparatus according to claim 11 including means for radially expanding the pocket at the nozzle position and for radially contracting the pocket at the transfer position.

13. Apparatus according to claim 11 wherein the pocket is unthreaded at the end thereof, adjoining the nozzle to a depth corresponding approximately to the axial length of the screw and has an adjoining threaded portion, and wherein the tool-actuating means comprises mechanism for simultaneously advancing and rotating the tool to move the screw through the threaded portion of the pocket and into the work piece.

14. In apparatus of the character described, means for supporting work pieces at an assembly station, a reciprocatory carrier for presenting hollow set screws successively at said station for assembly in the work pieces, said screws having a hollow socket at one end and having a solid tip at the other end, an assembly tool at said station, resilient means for advancing the tool for the assembly operation, motor means for rotating the tool simultaneously with said advance movement to effect said assembly, a clutch connecting the tool with said motor means, said clutch being adapted to slip at a predetermined torque to permit interruption of said rotation independently of the motor means, and means for retracting the tool after completion of said assembly.

15. In an apparatus of the character described, means for supporting work pieces at an assembly station, a reciprocatory carrier for presenting screws successively at said station for assembly in the work pieces, said carrier comprising a screw-receiving pocket, mechanism at said station for effecting said assembly and including an element for transferring the screws from the pocket to the work piece, a receiving station remote from said assembly station, means at said receiving station for feeding screws successively to the said carrier pocket, resilient means tending to advance the carrier to the assembly station, a cam for controlling the advance movement of the carrier under actuation by said resilient means and for retracting the carrier to the receiving station, and means independent of the cam for registering the pocket with the transfer element.

16. In apparatus of the character described, means for supporting work pieces at an assembly station, a transfer tool at said station, and means for feeding screws to said station for transfer to the work by said tool, said feeding means comprising a rotary carrier having a circumferential series of screw-receiving pockets, means for feeding individual screws endwise to the respective pockets for delivery in succession to said station, means in each of said pockets for rejecting screws lacking a predetermined endwise orientation, and means on said rotary carrier for dislodging the rejected screws from the delivery end of the feeding means.

17. In orienting apparatus for work elements having a socket at one end and a solid tip at the other end, a rotary carrier having a circumferential series of pockets for reception of said elements, a conduit for feeding the said elements endwise to said pocket, said conduit terminating at a point in alignment with and in close proximity to the path of movement of the outer ends of pockets in the upper part of the carrier, means in said pockets co-active with the socket to admit the working elements only when the elements are presented to the pocket by said conduit with the socket end in leading position and for rejecting the elements when presented in reverse position, an opening in the wall of and at the said terminal end of the conduit for discharge laterally from the conduit of the work elements so rejected, and a radially projecting shoulder on the carrier at the trailing side of each of the pockets for engaging and effecting the said discharge of the rejected elements.

18. In apparatus of the character described, means for supporting work pieces at an assembly station, a transfer tool at said station, and means for feeding screws to said station for transfer to the work by said tool, said feeding means comprising a rotary carrier having a circumferential series of screw-receiving pockets, means for feeding individual screws endwise to the respective pockets, a conduit terminating at a point in alignment with and in close proximity to the path of movement of the outer ends of the pockets in the lower part of the carrier for receiving the screws from the pockets for delivery in succession to said station, an opening in the wall of and at the said terminal end of the conduit for discharge laterally from the conduit of the screws in excess of the screw holding capacity of the conduit, and a radially projecting shoulder on the carrier at the trailing side of each of the pockets for engaging and effecting the said discharge of the screws in the upper end of the conduit through said opening.

References Cited in the file of this patent

UNITED STATES PATENTS

| | | |
|---|---|---|
| 233,062 | Barlow | Oct. 13, 1880 |
| 1,195,571 | Flaherty | Aug. 22, 1916 |
| 1,863,314 | Phelps et al. | June 14, 1932 |
| 2,281,190 | Bertalan et al. | Apr. 28, 1942 |
| 2,616,324 | Bailey et al. | Nov. 4, 1952 |
| 2,628,646 | Bailey et al. | Feb. 17, 1953 |
| 2,630,221 | Stewart | Mar. 3, 1953 |
| 2,670,077 | Drew | Feb. 23, 1954 |
| 2,728,252 | Connel | Dec. 27, 1955 |

FOREIGN PATENTS

| | | |
|---|---|---|
| 460,901 | France | Oct. 16, 1913 |